United States Patent [19]
Couche

[11] Patent Number: 5,669,960
[45] Date of Patent: Sep. 23, 1997

[54] HYDROGEN GENERATION PROCESS

[75] Inventor: Michael Robert Couche, Williamsville, N.Y.

[73] Assignee: Praxair Technology, Inc., Danbury, Conn.

[21] Appl. No.: 552,327

[22] Filed: Nov. 2, 1995

[51] Int. Cl.$^6$ .................................................. B01D 53/047
[52] U.S. Cl. ........................... 95/96; 95/121; 95/139; 95/143; 423/359; 423/651
[58] Field of Search .................. 95/96, 117, 121, 95/122, 139, 143; 423/359, 651, 652, 655, 656

[56] References Cited

U.S. PATENT DOCUMENTS

| | | | |
|---|---|---|---|
| Re. 31,014 | 8/1982 | Sircar | 95/139 X |
| 3,085,379 | 4/1963 | Kiyonaga et al. | 95/96 |
| 3,150,942 | 9/1964 | Vasan | 95/122 X |
| 3,212,236 | 10/1965 | Skarstrom et al. | 95/96 |
| 3,699,218 | 10/1972 | Smith et al. | 95/139 X |
| 3,720,042 | 3/1973 | Simonet | 95/139 X |
| 3,839,847 | 10/1974 | Banikiotes et al. | 95/96 |
| 4,077,779 | 3/1978 | Sircar et al. | 95/139 X |
| 4,432,774 | 2/1984 | Jüntgen et al. | 95/96 |
| 4,553,981 | 11/1985 | Fuderer | 48/62 |
| 4,732,596 | 3/1988 | Nicholas et al. | 95/122 X |
| 4,778,670 | 10/1988 | Pinto | 95/96 X |
| 4,790,858 | 12/1988 | Sircar | 95/139 X |
| 4,913,709 | 4/1990 | Kumar | 95/139 X |
| 4,914,218 | 4/1990 | Kumar et al. | 95/139 X |
| 4,963,339 | 10/1990 | Krishnamurthy et al. | 95/139 X |
| 5,096,470 | 3/1992 | Krishnamurthy | 95/139 X |
| 5,133,785 | 7/1992 | Kumar et al. | 95/139 X |
| 5,152,975 | 10/1992 | Fong et al. | 423/652 |
| 5,154,736 | 10/1992 | Mifflin | 95/139 X |
| 5,203,888 | 4/1993 | Maurer | 95/122 X |
| 5,234,472 | 8/1993 | Krishnamurthy et al. | 95/139 X |
| 5,382,280 | 1/1995 | Choe et al. | 95/98 |
| 5,435,836 | 7/1995 | Anand et al. | 95/96 X |

*Primary Examiner*—Robert Spitzer
*Attorney, Agent, or Firm*—Bernard Lau

[57] ABSTRACT

A process for the production of hydrogen that purifies a synthesis gas stream, containing hydrogen, carbon monoxide and combustibles, in a PSA unit. The PSA unit produces at least three streams: a substantially pure hydrogen product stream, a combustible-rich first tail-gas stream, and a carbon dioxide-rich second tail gas stream.

17 Claims, 4 Drawing Sheets

5,669,960

HYDROGEN GENERATION PROCESS

FIELD OF THE INVENTION

The invention relates to the purification of a $H_2$ containing gas stream to produce high purity $H_2$. More particularly, the invention relates to the use of a pressure swing adsorption system to separate the gas stream into a $H_2$ product stream and two waste gas streams, one containing most of the combustibles and the other containing most of the $CO_2$.

BACKGROUND OF THE INVENTION $H_2$ can be produced by several known processes. The two most frequently employed are steam reforming and partial oxidation of various hydrocarbons in a gasifier which produce a synthesis gas (syngas). The $H_2$ containing gas produced from such operations is usually subjected to a water-gas shift converter to convert CO to $CO_2$ and $H_2O$ to more $H_2$. Subsequently, the gas stream may be treated in a number of ways to achieve the required $H_2$ purity. For example, $CO_2$ may be removed by means of a scrubber followed by drying and cryogenic purification. This $CO_2$ removal process requires elimination of essentially all the $CO_2$ from the gas stream, to achieve the desired $H_2$ product, which results in high costs.

Alternatively, a pressure swing adsorption (PSA) unit is used to purify the gas stream. The known processes produce two streams from the PSA, a $H_2$ product stream and a tail gas stream containing mostly $CO_2$ with smaller quantities of $H_2$, CO, $CO_4$, water, $N_2$ and Ar. The small quantities of combustibles make the tail gas stream a low quality fuel (typically 80–250 btu/scf Lower Heating Value (LHV)). Addition of a high quality fuel (e.g. natural gas) is required to stabilize the flame when burning this tail gas. Depending on the type of syn gas generator employed, capital investment may also be required in a fired boiler and accompanying steam system to burn the PSA tail gas. Also, if burning results in high NOx levels, even more capital investment is required for a catalytic reduction unit to reduce NOx emissions.

$CO_2$ is removed from the PSA tail gas, so that it can be recompressed and recycled to the syngas generator. U.S. Pat. No. 4,553,981 discloses such a process. The entire gas stream is subjected to an acid gas removal system to reduce the $CO_2$ content before purification in the PSA. This allows the PSA to handle a crude $H_2$ stream with little or no $CO_2$ in it. Thus the PSA is physically smaller and less expensive. In addition, this reference teaches the use of a supplemental PSA to further purify the $CH_4$ containing waste gas from the first PSA. $CO_2$ removal is still carried out in a scrubber before entering the first PSA.

$CO_2$ can also be removed by scrubbing after processing through the PSA as discussed in U.S. Pat. No. 5,152,975. This reference requires a specific feed type, i.e. gaseous hydrocarbonaceous feed, which lowers the $CO_2$ content of the shift conversion effluent. In this case there are no PSA savings, but the absorber column of the $CO_2$ removal unit will be smaller and less expensive as it is used only for $CO_2$ removal from the waste gas recycle stream before it is fed to the shift converter. Essentially $CO_2$-free product $H_2$ is achieved in this case by using a specific feed type.

However, in both U.S. Pat. No. 4,553,981 and U.S. Pat. No. 5,152,975, the $CO_2$ is removed by acid gas removal systems. These acid gas removal systems involve high capital costs as they usually consist of an absorber column, a stripper column, one or more pumps and several heat exchangers. Furthermore, the handling of acid gas requires that some of this equipment be fabricated of stainless steel, thus increasing the cost.

Acid gas removal systems also generate high operating costs as a result of the heat required to drive the reboiler of the $CO_2$ stripping column which is lost to the atmosphere by air or water cooling in the overhead condenser. Furthermore, there are operating costs associated with chemicals, maintenance and labor for the system.

U.S. Pat. No. 5,382,280 discloses a two stage PSA unit. This system uses the first stage to remove the bulk of the more strongly adsorbed component and the second stage to remove trace amounts of the more strongly adsorbed component. Where $N_2$ is the less strongly adsorbed component and $O_2$ is the more strongly adsorbed component, high purity $N_2$ is obtained from the first stage and the waste gas passed to the second stage to produce more high purity $N_2$. The desorbed gas from the second stage when depressurized is recycled to the first stage. Thus this system produces only two products, high purity $N_2$ which is taken off of both stages and one desorbed gas which is taken off the second stage.

OBJECTS OF THE INVENTION

It is an object of the invention, therefore, to provide an improved process and system for the enhanced recovery of purified $H_2$ product from effluent gas streams.

It is another object of the invention to provide an improved overall process and system for the treatment of an effluent gas stream in which final purification is achieved by a PSA.

A further object of the invention is to produce a $H_2$ product stream, a $CO_2$ tail gas stream to be vented and a tail gas stream to be recycled or burned, without the need for supplemental fuel for combustion of the tail gas and with a reduction in NOx emissions.

A still further object of the invention is to have the $CO_2$ tail gas meet or exceed environmental requirements for venting to the atmosphere or which is of salable quality for further processing.

SUMMARY OF THE INVENTION

The above mentioned objects and others which will be apparent to those skilled in the art, are achieved by the present invention, which comprises a process for separation of a synthesis gas stream into a pure $H_2$ product stream and two tail gases using a PSA unit for final purification. Removal of $CO_2$ in the second tail gas stream is achieved without the use of an acid gas removal system or scrubbing. This second tail gas stream can be vented or sold for further processing. Also, the resulting first tail gas stream is of the quality that allows for recovery of the valuable components or burning without additional fuel. The invention accommodates a variety of feed gas options, gas, liquid or solid, and various methods of obtaining the syngas.

BRIEF DESCRIPTION OF THE DRAWINGS

Other objects, features and advantages will occur from the following description of preferred embodiments and the accompanying drawings, in which.

DETAILED DESCRIPTION OF THE INVENTION

This invention may be accomplished by applying pressure swing adsorption to purify a synthesis gas stream and produce a pure $H_2$ product and two "tail gases", a first tail gas containing most of the combustibles and a second tail gas containing essentially all the $CO_2$. Purification is carried out in a Pressure Swing Adsorption (PSA) unit which removes impurities from the synthesis gas by applying a pressure change to the adsorbent bed. Removal of $CO_2$ is entirely accomplished in the purification step by the PSA unit. $H_2$, being the less adsorbable component of the PSA feed, is discharged as a substantially pure product stream. The more adsorbable components include $CO_2$, and other impurities such as CO and $CH_4$ which are combustibles. These are released from the adsorbent during the desorption step in each adsorbent bed of the PSA unit. The operation of the PSA cycle is well known. In one cycle of the PSA unit, pressurization is followed by countercurrent depressurization. Adsorption occurs at the higher pressure while desorption or release of the gas from the adsorbent material occurs during depressurization in each adsorbent bed of the unit. At the end of the desorption step, the cycle continues with repressurization of the bed.

A supply of synthesis gas (syngas) for the invention can be obtained from one of the known processes. Any reactor means which produces a $H_2$/CO syngas from a hydrocarbon feed gas may be utilized. Such means include partial oxidation in a gasifier (POX), steam-methane reformer (SMR) and autothermal reactor (ATR) which all provide a $H_2$ containing stream consisting mainly of combustibles, such as $H_2$, CO and $CH_4$, and non-combustibles such as $CO_2$, $H_2O$, $N_2$ and Ar. If solid carbon is present as with POX generated syngas, it is removed in a scrubber.

When the syngas generator is a SMR in a standard $H_2$ plant, the PSA tail gas is burned in the reformer furnace to provide the heat necessary to drive the endothermic reforming reaction. There is no need to remove the $CO_2$ contained in the tail gas. In fact, if the tail gas is not used for this purpose, some other high value fuel (e.g. natural gas) would be needed to replace its heating value. Thus, the SMR syngas generation is not as attractive as the other options.

A variety of choices in reactors further allows for choices in the type of hydrocarbon feed used for the invention. It is not necessary to have a gaseous feed. In some cases, liquids may be used and with the POX reactor, even solid hydrocarbons may be used. Where the hydrocarbon feed used is not a gas, a separate recycle compressor is necessary for the first tail gas.

Figure 1:
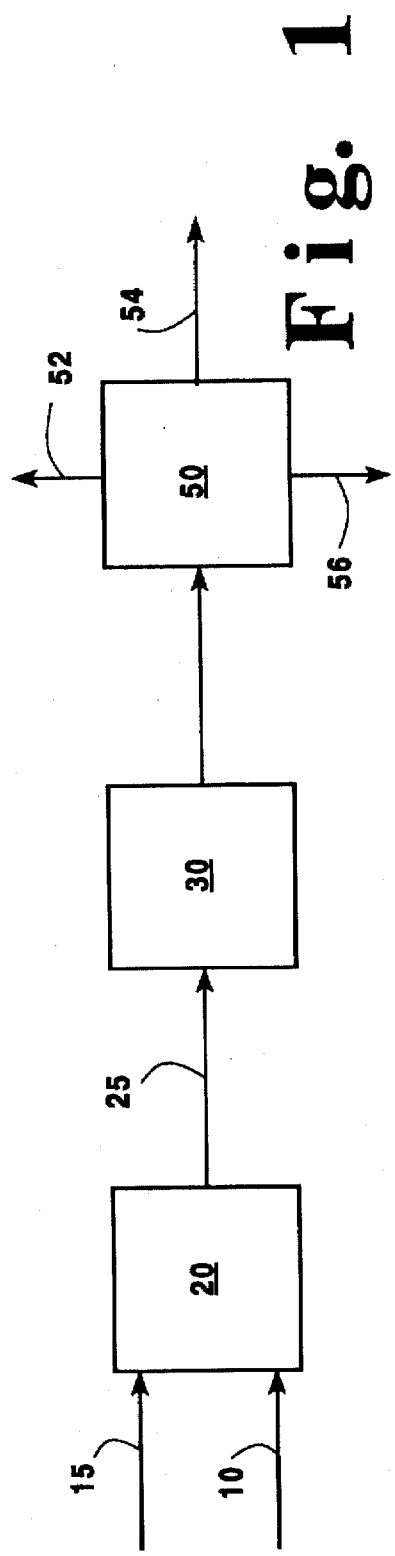
FIG. 1 is a process flow diagram of the invention, where one PSA unit is employed to separate the feed into $H_2$ product, first tail gas and second tail gas.

FIG. 1 shows one embodiment of the invention where a syngas 25 is produced by feeding a gaseous hydrocarbon feed 10 and oxygen 15 to a partial oxidation unit 20. The syngas 25 comprises primarily of $H_2$, CO, $CH_4$, $CO_2$, $H_2O$, $N_2$ and Ar. After cooling the syngas gas, the CO therein is catalytically converted to $CO_2$ in a water-gas shift converter 30. The PSA unit 50 produces a pure $H_2$ product 54, and two tail gases. The operation of the PSA to produce the three streams will be subsequently described in detail with reference to FIGS. 2 and 3.

The first tail gas 56 is combustible-rich, containing unrecovered $H_2$ and essentially all of the CO and $CH_4$ that was in the PSA feed. Some $N_2$, Ar, $CO_2$ and $H_2O$ may also be contained in this stream. The second tail gas 52 is combustible-lean and contains most of the $CO_2$ and water fed to the PSA. The content of the three streams emmitted by the PSA unit is shown in Table I.

TABLE I

|  | PRODUCT $H_2$ | COMBUSTIBLE-LEAN SECOND TAIL GAS | COMBUSTIBLE-RICH FIRST TAIL GAS |
|---|---|---|---|
| H2 | 98–100 | 0–2 | 0–25 |
| CO | 0–2 | 0–2 | 2–20 |
| CO2 | 0–2 | 90–100 | 50–80 |
| CH4 | 0–2 | 0–1 | 0–3 |
| H2O | 0–2 | 0–2 | 0–3 |
| N2 | 0–2 | 0–2 | 0–3 |
| AR | 0–2 | 0–2 | 0–3 |

COMPOSITIONS ARE MOLE %

Figure 1A:
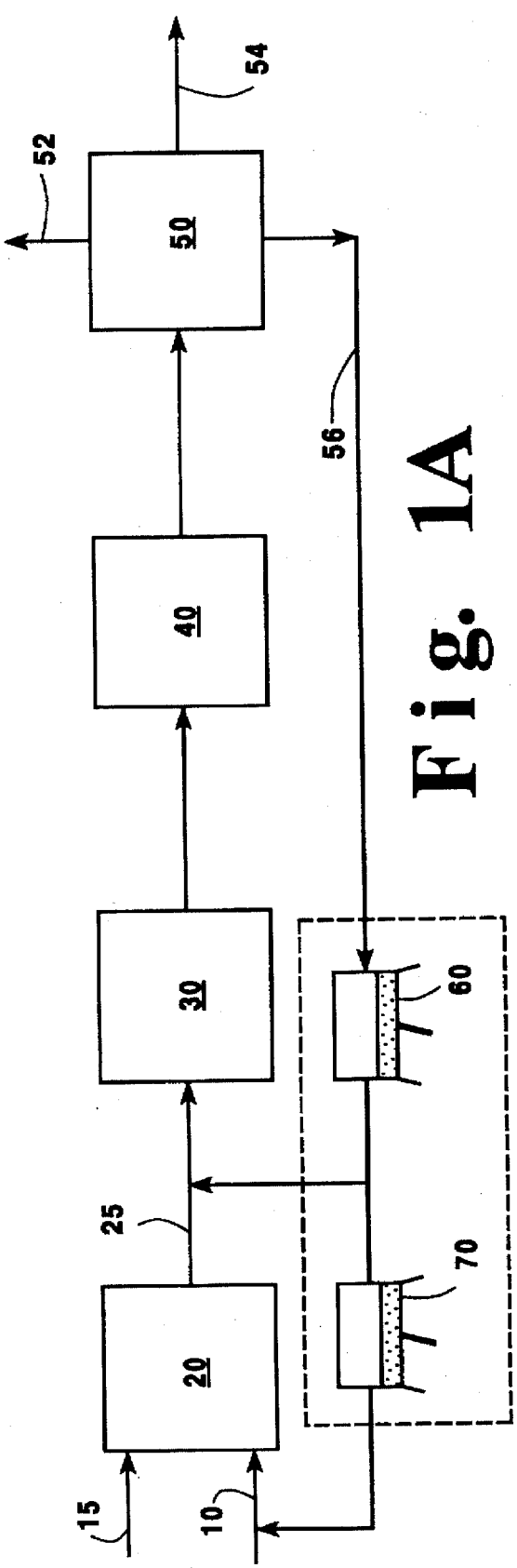
FIG. 1A is a preferred embodiment of the invention where the first tail gas is recycled.

In FIG. 1A the same process steps as described for FIG. 1 are shown but an additional step is added for heat recovery in this embodiment. Heat from the reaction in the water-gas shift converter 30 is recovered in a heat recovery unit 40, before final purification in a PSA unit 50. The preferred embodiment of FIG. 1A shows the invention where the first tail gas 56 is recycled to the gasifier and the shift converter, and the second tail gas 52 is vented or is available for further processing.

If the first tail gas 56 and a crude gaseous hydrocarbon feed 10 to the syngas generator 20 are available at similar pressures, the first tail gas can be directly recycled to a feed compressor (not shown) supplying the syngas generator 20. However, if the hydrocarbon feed 10 is at a higher pressure, as it often is in practice, than the first tail gas 56, then a separate compressor is used to boost the pressure in the first tail gas stream before recycling this stream. If the first tail gas has to be boosted, it is preferred as shown in FIG. 1A, to split the first tail gas recycle stream so that it is boosted by two separate stages of compression 60 and 70. This mode of operation offers the advantage of only having to boost part of the first tail gas stream up to the higher pressure of the hydrocarbon feed stream 10 entering the syngas gas generator 20. The other portion of the first tail gas stream is compressed only to the lower pressure of the syngas stream 25 entering the water-gas shift converter 30. Thus, there is a reduction in the recycle compression requirement since only a portion of the first tail gas stream is compressed to the higher pressure of the syngas generator 20. In this system, the syngas generator 20 is the only processing unit which removes $CH_4$ from the system by converting it to CO and $H_2$. Therefore, the portion of the first tail gas stream recycled to the syngas generator must be sufficient to prevent a continuous build up of $CH_4$ in the system. One advantage of recycling the combustible-rich first tail gas is that it eliminates the need for a fired boiler which would otherwise be required to burn the first tail gas. Additionally, the hydrocarbon feed requirement for the process is reduced since the invention allows substantially all $H_2$ to be recovered and $CH_4$ that otherwise would have been burned is now returned in the recycle to the feed. An 8% to 15% reduction in hydrocarbon feed for the system can be realized in comparison to a system that combusts the first tail gas to make steam.

$CO_2$ is produced in the formation of the syngas by steam-methane reforming or partial oxidation and by the water-gas shift conversion. The second tail gas 52 must remove sufficient amounts of $CO_2$ from the system to prevent continuous buildup of $CO_2$. The invention enables trace venting of the second tail gas to the atmosphere. If the trace amounts of combustibles such as $CH_4$, $CO$ and $H_2$, contained in the second tail gas, are at acceptable environmental limits, it is preferred that this stream is vented to the atmosphere. Another benefit of the invention is the ability to sell the second tail gas. Depending on the $CO_2$ content and impurities level in this stream, it can be salable for further processing, such as purification or liquefaction. It is also desirable to remove Ar and $N_2$ in the second tail gas.

Figure 2:
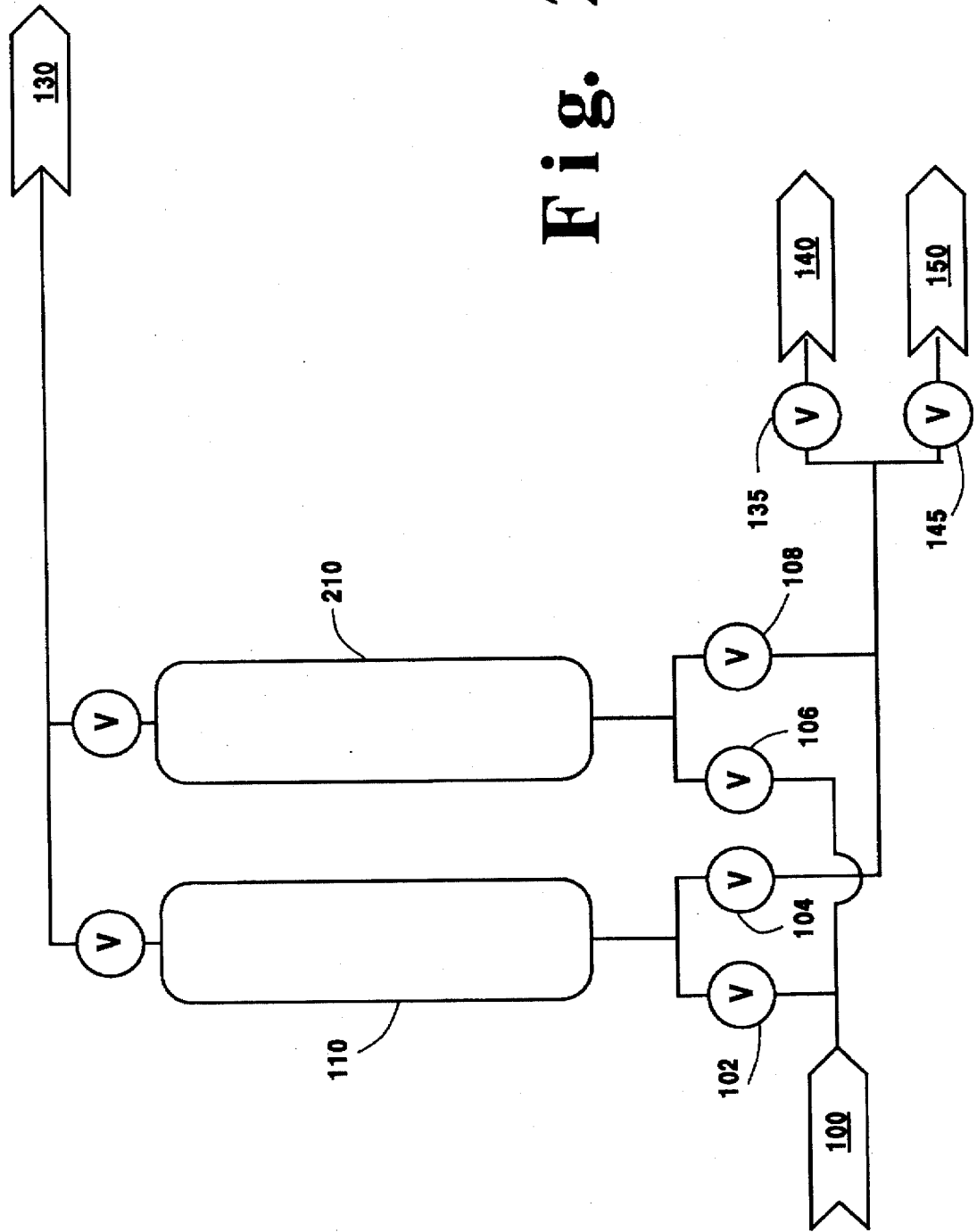
FIG. 2 shows an embodiment of the invention where the two tail gases are obtained at different levels of depressurization of the PSA beds.

There are several PSA unit configurations that are capable of producing the three desired streams of the invention. FIG. 2 shows one such configuration. In this embodiment, there is a single PSA unit with multiple beds which alternate between adsorbing impurities while in the pressurized state and desorbing the impurities from the adsorbent in the depressurization step of the cycle. Though only two beds are shown in FIG. 2, a PSA unit may have multiple beds, meaning two or more beds. A typical $H_2$ PSA unit may have 4 to 12 beds. Crude $H_2$ feed stream 100 is introduced through valve 102 to the PSA bed 110. As it flows through the adsorbent material in the bed, impurities are adsorbed and substantially pure $H_2$ is allowed to flow through and leaves the system as product $H_2$ in stream 130. At the end of an adsorption cycle, valve 102 is closed and bed 110 which was on-line is depressurized. During depressurization the impurities are desorbed or released from the adsorbent material in bed 110. When bed 110 is still at high pressure in the depressurization stage, the impurities released are taken off as the first tail gas 140 which flows through valve 104 and out of the system through valve 135. When the pressure is sufficiently low, valve 135 is closed and the second tail gas 150 which is mostly $CO_2$ flows through the open valve 145. Since the adsorbent material, such as molecular sieve or carbon based adsorbents, employed in beds 110 and 120 strongly adsorbs $CO_2$, it will tend to be retained until the end of the depressurization step i.e. until the pressure in the bed is relatively low. Thus at the higher depressurization pressure, the first tail gas 140, which is combustible-rich, is taken off. The second tail gas 150, combustible-lean, is taken off in the depressurization step, at the lower pressures when the $CO_2$ is released from the adsorbent.

While bed 110 is in the depressurization stage with the feed valve 102 closed and the depressurization valve 104 open, bed 120 is in the adsorbing stage with crude $H_2$ feed 100 supplied through valve 106 which is open while depressurization valve 108 is closed. The beds 110 and 120 alternate so that when one is in the adsorbing step the other is in depressurization.

Figure 3:
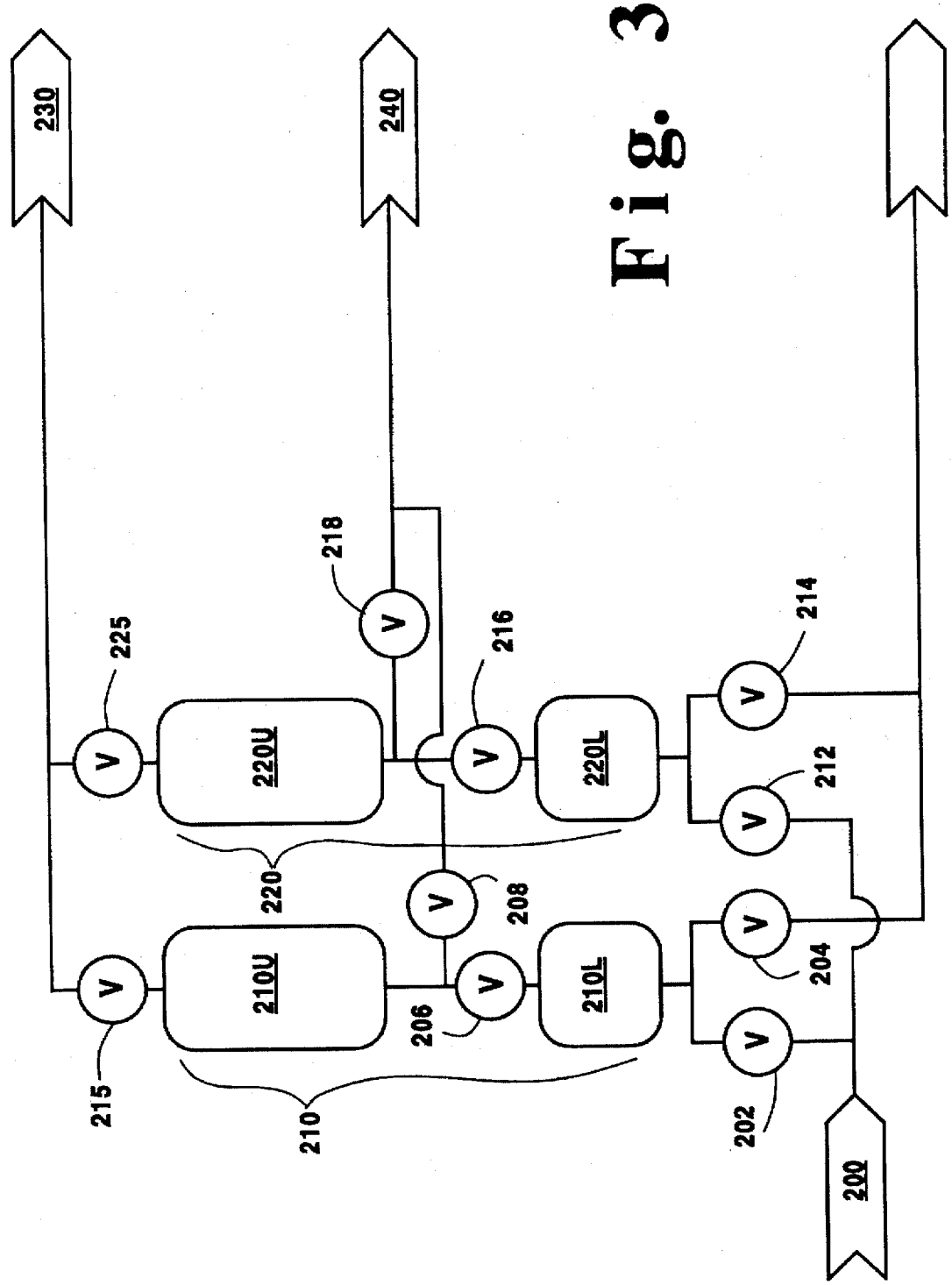
FIG. 3 presents another embodiment of the invention with one PSA unit having multiple beds and each bed having two vessels for obtaining two tail gases.

Another embodiment of the invention is shown in FIG. 3, with each PSA bed having two vessels, a lower and an upper vessel, in series. As in the previously described embodiment, crude $H_2$ feed 200 is introduced to the bed 210, through valve 202, here it enters the lower vessel 210L. Some of the impurities are adsorbed in the lower vessel 210L and the remainder of the feed stream exits the lower vessel and enters the upper vessel 210U of bed 210 via valve 206, for further purification. Impurities are further removed and substantially pure $H_2$ flows out of the upper vessel 210U through valve 215 and leaves the system as product $H_2$ 230. While bed 210 is running, the depressurization valves 208 and 204 are closed. Concurrently, the upper and lower vessels of bed 220 are cycling through the depressurization step. The feed valves 212 and 216 are closed to the lower vessel 220L and the upper vessel 220U respectively, as well as the product valve 225. The first tail gas 240 is taken off the upper vessel 220U through valve 218 and the second tail gas is taken off the lower vessel 220 L through valve 214. When this depressurization step is complete, the vessels of bed 220 will be regenerated while the vessels of bed 210, which were on line, would be switched to depressurization and the tail gases would be taken off the upper vessel 210U through valve 208 and the lower vessel 210L through valve 204. Because the $CO_2$ is strongly adsorbed by the adsorbent material, most of it will concentrate in the lower vessel that is on line. Thus, in the depressurization step, the second tail gas which is blown down from the lower vessel would be combustible-lean, while the first tail gas blown down from the upper vessel would be combustible-rich, with negligible amounts of $CO_2$.

Figure 4:
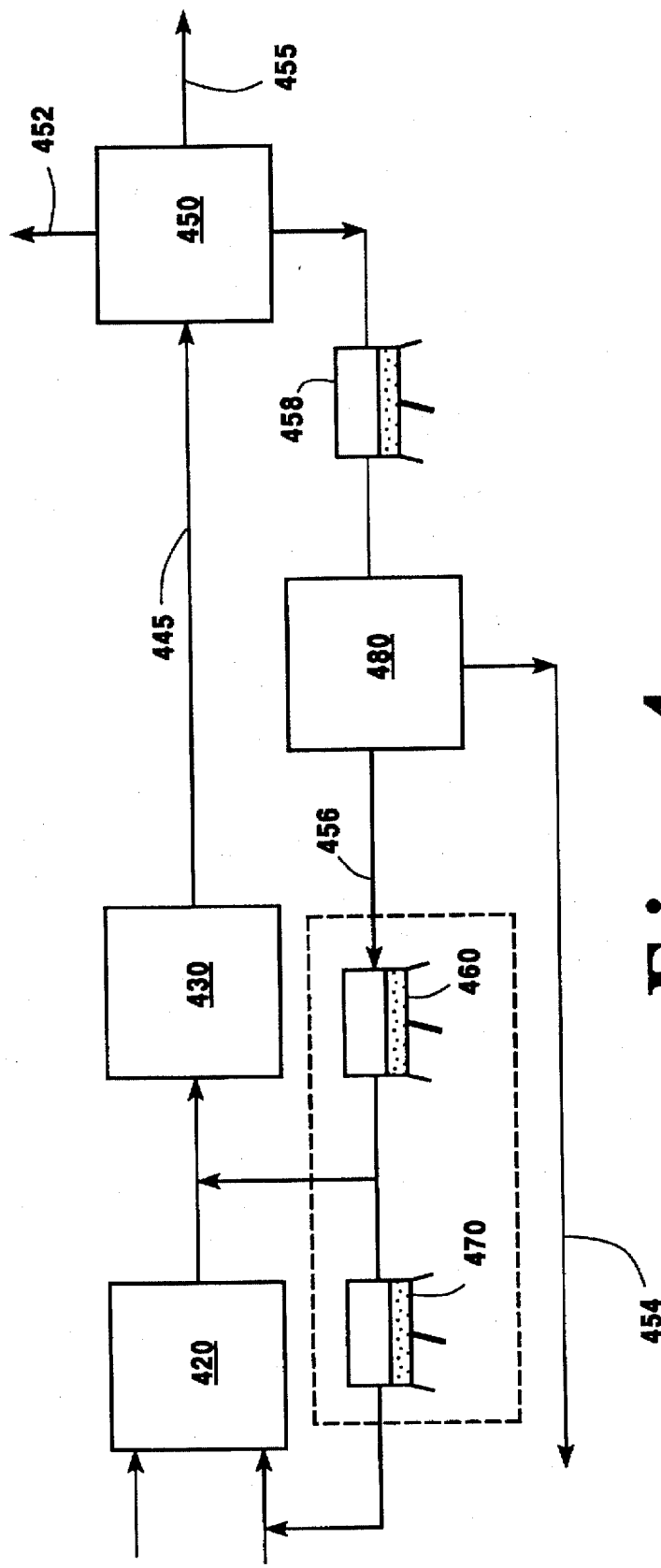
FIG. 4 shows yet another embodiment of the invention using two PSA modules, a $H_2$ PSA module and a $CO_2$ PSA module.

FIG. 4 shows an embodiment of the invention with two separate PSA modules employed to obtain the three desired streams. In this configuration, a standard $H_2$ PSA module 450 separates crude $H_2$ into two streams, pure product $H_2$ 452 and an intermediate gas stream 455 containing all the impurities present in the $H_2$ PSA feed 445. The intermediate gas 455 is then recompressed in compressor stage 458 and fed to a $CO_2$ PSA module 480. This $CO_2$ PSA module yields a substantially pure $CO_2$ second tail gas stream 454, that is combustible-lean, and a first tail gas stream 456 that is combustible-rich, containing $CH_4$, $CO$, and unrecovered $H_2$. The $CO_2$ stream 454 is vented or sold while the first tail gas 456 is recompressed in compressor stages 460 and 470 and recycled to the syngas generator 420 and the water-gas shift converter 430 respectively.

There are other options for use of the first tail gas that is separated in the PSA unit. The first tail gas which contains the combustibles, can be burned in a fired boiler to produce superheated steam and used for equipment drivers, power production, other process feeds, thermal purposes, or exported for revenue. The first tail gas produced by the method of this invention offers an advantage over the prior art in that since it contains mainly combustibles, it has a higher heating value and does not require supplemental fuel for proper burning and thus utility costs are lower. Additionally, a smaller, less expensive fired boiler is required.

Operating conditions are also flexible for the invention. Pressures and temperatures are determined by the pressure desired for the product $H_2$, and a maximum is set by equipment limitations. When the syngas is produced by a gasifier, $H_2$ product can range from 100 to 1000 psig. The first and second tail gases will range from 5–100 psig and 60–120 deg F.

Specific features of the invention are shown in one or more of the drawings for convenience only, as each feature may be combined with other features in accordance with the invention. Alternative embodiments will be recognized by those skilled in the art and are intended to be included within the scope of the claims.

I claim:

1. A process for the production of $H_2$ comprising:
    (a) providing a synthesis gas stream, containing $H_2$, $CO_2$ and combustibles to a PSA unit;
    (b) purifying the synthesis gas stream in the PSA unit to remove $CO_2$ and to produce at least three streams: (1) a $H_2$ product stream, (2) a combustible-rich first tail gas stream and (3) a combustible-lean second tail gas stream;

wherein no additional $CO_2$ removal step is required in the process for the production of the three streams of step (b)

and wherein the combustible lean second tail gas contains at least 90 mole % $CO_2$.

2. The process as in claim 1, wherein said synthesis gas is produced in a crude $H_2$ generator and said first tail gas stream is recycled to said crude $H_2$ generator.

3. The process as in claim 2, further comprising a shift converter for converting CO in said synthesis gas to $CO_2$.

4. The process as in claim 3, wherein said first tail gas stream is separated into third and fourth streams, and said third stream is recycled to the shift converter and said fourth stream is recycled to the syngas generator.

5. The process of claim 3 wherein heat is removed after converting CO to $CO_2$ in the shift converter and before purifying in the PSA unit.

6. The process of claim 1 wherein the synthesis gas stream further comprises: $N_2$, Ar and water.

7. The process of claim 1 wherein the combustible-rich first tail gas comprises unrecovered $H_2$, and substantially all the CO and $CH_4$ from the PSA feed.

8. The process of claim 1 wherein the combustible-lean second tail gas comprises substantially all of the $CO_2$ and water from the PSA feed.

9. The process of claim 1 wherein the PSA unit comprises multiple beds each having one vessel and consecutively alternating between depressurization and pressurized stages so that one bed at a time is on-line.

10. The process of claim 1 wherein the PSA unit comprises multiple beds which consecutively alternate between on-line and depressurization and each bed having two vessels, an upper vessel which emits a product $H_2$ stream and a first tail gas stream, and a lower vessel which emits a second tail gas stream.

11. The process of claim 1 wherein the PSA unit comprises a $H_2$ PSA module and a $CO_2$ PSA module, the $H_2$ PSA module emitting a $H_2$ product stream and an intermediate gas stream, said intermediate gas stream being recompressed and fed to the $CO_2$ PSA module which emits a combustible-lean second tail gas stream and a combustible-rich first tail gas stream.

12. The process of claim 1 wherein the synthesis gas is produced by a gasifier.

13. The process of claim 1 wherein the synthesis gas is produced by an autothermal reactor.

14. The process of claim 1 wherein the feed for producing the synthesis gas is a liquid or solid hydrocarbon.

15. The process of claim 1 wherein the first tail gas is burned in a fired boiler to produce superheated steam.

16. The process of claim 1 wherein the second tail gas contains small enough trace quantities of combustibles to be directly vented to the atmosphere at a flow rate sufficient to prevent $CO_2$ build up.

17. A process for the production of $H_2$ comprising:
(a) using a synthesis gas generator to produce a synthesis gas stream from a feed gas comprising $H_2$, CO, $CO_2$, $CH_4$, $N_2$, Ar and water;
(b) cooling the synthesis gas;
(c) converting the CO in the synthesis gas to $CO_2$ in a water-gas shift converter to produce a PSA feed gas;
(d) removing heat from the PSA feed gas;
(e) purifying the PSA feed gas in a dual-tail gas PSA unit to produce three streams, a $H_2$ product stream, a combustible-rich first tail gas stream comprising unrecovered $H_2$ and all the CO and $CH_4$ from the PSA feed, and a combustible-lean second tail gas stream comprising most of the $CO_2$ and water from the PSA feed;
wherein no additional $CO_2$ removal step is required to produce the three streams of step (e).

* * * * *